United States Patent
Suemichi

(10) Patent No.: US 12,228,446 B2
(45) Date of Patent: Feb. 18, 2025

(54) COMBINATION SCALE

(71) Applicant: Yamato Scale Co., Ltd., Hyogo (JP)

(72) Inventor: Ryo Suemichi, Hyogo (JP)

(73) Assignee: YAMATO SCALE CO., LTD., Hyogo (JP)

( * ) Notice: Subject to any disclaimer, the term of this patent is extended or adjusted under 35 U.S.C. 154(b) by 386 days.

(21) Appl. No.: 17/790,216

(22) PCT Filed: Feb. 7, 2020

(86) PCT No.: PCT/JP2020/004852
§ 371 (c)(1),
(2) Date: Jun. 30, 2022

(87) PCT Pub. No.: WO2021/157058
PCT Pub. Date: Aug. 12, 2021

(65) Prior Publication Data
US 2022/0397446 A1    Dec. 15, 2022

(51) Int. Cl.
G01G 19/393    (2006.01)

(52) U.S. Cl.
CPC ................... G01G 19/393 (2013.01)

(58) Field of Classification Search
CPC ............................. G01G 19/393; G01G 21/00
USPC ....................................................... 177/25.18
See application file for complete search history.

(56) References Cited

U.S. PATENT DOCUMENTS

| | | | |
|---|---|---|---|
| 6,493,605 B1 | 12/2002 | Prideaux et al. | |
| 9,194,735 B2 * | 11/2015 | Tamai | G01G 19/393 |
| 9,409,726 B2 * | 8/2016 | Pape | B65G 69/0408 |
| 9,697,337 B2 | 7/2017 | Goodnow, II et al. | |
| 10,323,977 B2 | 6/2019 | Horitani et al. | |
| 10,403,456 B2 | 9/2019 | Horitani et al. | |
| 10,801,880 B2 | 10/2020 | Takeichi et al. | |
| 2005/0175742 A1 * | 8/2005 | Kornely | B65B 29/08 426/106 |
| 2023/0152143 A1 * | 5/2023 | Nagai | G01G 19/393 177/59 |
| 2023/0322494 A1 * | 10/2023 | Shimatani | B65G 27/16 |

FOREIGN PATENT DOCUMENTS

| | | | | |
|---|---|---|---|---|
| CN | 101421596 | * | 4/2009 | ........... G01G 19/393 |
| CN | 105675103 A | | 6/2016 | |
| CN | 107079598 A | | 8/2017 | |
| CN | 108780003 A | | 11/2018 | |
| JP | 2001221681 A | | 8/2001 | |
| JP | 2011-94689 A | | 5/2011 | |

(Continued)

OTHER PUBLICATIONS

Office Action issued Aug. 15, 2022 in Chinese Patent Application No. 202010387166.9.

(Continued)

*Primary Examiner* — Jacques M Saint Surin

(74) *Attorney, Agent, or Firm* — Norris McLaughlin, P.A.

(57) ABSTRACT

A combination scale includes a pedestal having, at its center, an opening that vertically penetrates therethrough, and a center base body equipped with linear feeders and hoppers. The center base body is supported on the pedestal through leg portions. The pedestal has an upper surface formed so as to incline downward toward an outer end thereof.

7 Claims, 6 Drawing Sheets

(56) References Cited

FOREIGN PATENT DOCUMENTS

| | | |
|---|---|---|
| JP | 2011-163957 A | 8/2011 |
| JP | 2014-85165 A | 5/2014 |
| WO | 97/019330 A1 | 5/1997 |
| WO | 2016/043325 A1 | 3/2016 |
| WO | 2016/067883 A1 | 5/2016 |

OTHER PUBLICATIONS

Office Action issued Feb. 25, 2023 in Chinese Patent Application No. 202010387166.9.

* cited by examiner

COMBINATION SCALE

TECHNICAL FIELD

This invention relates to a combination scale for use in mixing, weighing and discharging a predetermined quantity of different kinds of articles at a time, for example, snacks, sweets and frozen foodstuffs.

BACKGROUND ART

In conventional combination scales, an example of which is described in Patent Literature 1, a center base body is supported, through a plurality of leg portions, on a pedestal. The pedestal has, at its center, an opening that vertically penetrates therethrough. The combination scale is further equipped with a conical dispersion feeder and a plurality of linear feeders. The dispersion feeder is disposed in an upper part of the center base body, and the linear feeders are disposed around the dispersion feeder. The dispersion feeder radially transports, through vibrations, articles supplied from above. The linear feeders receive the articles supplied from the dispersion feeder and transports them further outward.

The combination scale is further equipped with a plurality of feeding hoppers and a plurality of weighing hoppers. The feeding hoppers and the weighing hoppers are disposed in the outer circumference of the center base body. The feeding hoppers temporarily retain the articles ejected and received from the linear feeders. The weighing hoppers measure the weights of the articles ejected and received from the feeding hoppers. Collection chutes are disposed below the weighing hoppers. The collection chutes each collect the articles from the weighing hoppers selected, through combinatorial computations, as an optimal combination of weighing hoppers containing the articles having a summed weight that falls within a predetermined range of weights. A collection funnel is disposed below the collection chutes. The collection funnel collects the articles thrown into this funnel from the collection chutes and discharge the collected articles downward.

Electrical components including electronic parts and a circuit board are housed in the hollow pedestal. The pedestal has outer lateral surfaces each having an opening used for inspection and maintenance of the electrical components housed therein.

The combination scales used to process and weigh foodstuffs need to be washed and cleaned at times. In combination scales used to weigh frozen food, in particular, water may possibly be generated from the frozen food thawed during the weighing operation. The openings of the pedestal, therefore, are each conventionally sealed with a detachable cover plate, so that the pedestal become waterproof and block the inflow of cleaning water.

CITATION LIST

Patent Literature

Patent literature 1: JP 2011-163957 A

SUMMARY OF INVENTION

Technical Problem

As described earlier, cleaning is indispensably required of such food-handling combination scales; cleaning at regular intervals and also cleaning whenever necessary for such instances as any change of foodstuffs to be weighed. Another issue to be addressed with these combination scales is water generated from frozen food possibly thawed during the weighing operation.

Thus, cleaning water and/or water generated from thawed frozen food during the weighing operation may accidentally drop onto the pedestal and remain undried there, and such water left undried on the pedestal may involve the risk of bacteria and/or mold propagation. Such a trouble may be avoidable if the cleaning water or any other fluid on the pedestal is carefully wiped off. This is, however, a laborious work demanding a considerable amount of time.

To address these issues of the known art, this invention is directed to finding a solution that can successfully avoid such an event that cleaning water or any other fluid drops onto the pedestal and remains undried there.

Technical Solution

To this end, this invention provides the following technical features.

1] A combination scale according to this invention includes:
   a pedestal having, in a central part thereof, an opening that vertically penetrates therethrough;
   a center base body supported on the pedestal through a leg portion;
   a dispersion feeder disposed in an upper part of the center base body, the dispersion feeder being driven to receive and radially transport an article;
   a plurality of linear feeders disposed around the dispersion feeder, the linear feeders being driven to transport the article received from the dispersion feeder; and
   a plurality of hoppers disposed in an outer circumference of the center base body, the hoppers being driven to retain and discharge the article.

The pedestal has an upper surface inclined downward toward an outer end thereof.

In the combination scale according to this invention, cleaning water or any other fluid, if it drops on the upper surface of the pedestal inclining downward toward its outer end, may be difficult to stay on the upper surface but is more likely to drop downward along the upper surface. Thus, the upper surface of the pedestal may soon be naturally dried without any wiping-off work, and the risk of bacteria and/or mold propagation may be successfully avoided.

2] In a preferred embodiment of this invention, the pedestal is structurally hollow and has an opening on a lateral surface thereof, and the pedestal further has a protruding portion formed by protruding a peripheral edge of the opening outward, the protruding portion constituting an upper side of the opening and having an upper surface inclined downward toward an end of the upper side.

According to this embodiment, cleaning water or any other fluid running outward on the upper surface and further running downward along the lateral surface of the pedestal may partly flow into the protruding portion that protrudes outward toward the peripheral edge of the opening. This flow of water is then guided along the upper inclined surface of the protruding portion constituting the opening upper side and is further guided downward and discharged from an end of the inclined surface. Thus, cleaning water or any other fluid may be unlikely to stay on the upper surface of the protruding portion that protrudes outward.

3] In another embodiment of this invention, the upper side of the opening forms a chevron-like shape with an apex thereof being located at a central position, and the upper surface of the protruding portion has a chevron-like shape along the upper side of the opening.

According to this embodiment, the upper surface of the protruding portion has the same chevron-like shape as the upper side of the opening. Thus, cleaning water or any other fluid flowing on the upper surface of the protruding portion may diverge and flow downward along the slopes on two sides of the chevron apex toward both ends of the pedestal and then discharged from these ends.

4] In yet another embodiment of this invention, the pedestal has a flange portion formed by folding outward an end of protrusion of the protruding portion at the peripheral edge of the opening, and a cover plate is attached to an outer surface of the flange portion with a sealing member being interposed therebetween to water-tightly close the opening.

According to this embodiment, an end of the protruding portion that protrudes more outward than the opening peripheral edge is folded to form a flange portion, and a groove is formed by this flange portion and the opening-formed lateral surface of the pedestal. Then, cleaning water or any other fluid running toward the protruding portion may be guided to flow downward along the groove and then discharged. Thus, such water may be unlikely to drop on any sealed portion.

5] In an embodiment of this invention, the pedestal has an angular outer shape in planar view, a corner portion of the angular shape includes a material that differs from a material used to form a linear portion other than the corner portion, and the corner portion and the linear portion are pushed against and joined to each other.

According to this embodiment, the corner portion made from a material that differs from the material of the linear portion may be allowed to have any optional shape or rigidity.

6] In yet another embodiment of this invention, the corner portion protrudes more upward than the upper surface of the linear portion.

According to this embodiment, the upper surface of the corner portion greater in height than the linear portion may effectively serve as a rib, improving the rigidity of the corner portion. As a result, the whole pedestal may be greatly improved in strength.

Effects of the Invention

As described thus far, the combination scale according to this invention may prevent cleaning water or any other fluid from being left undried on the pedestal and thereby avoid the risk of bacteria or mold propagation. The combination scale thus hygienically improved may successfully perform a weighing operation without any risk of contamination.

DESCRIPTION OF EMBODIMENTS

Embodiments of this invention are hereinafter described in detail with reference to the accompanying drawings.

Figure 1:
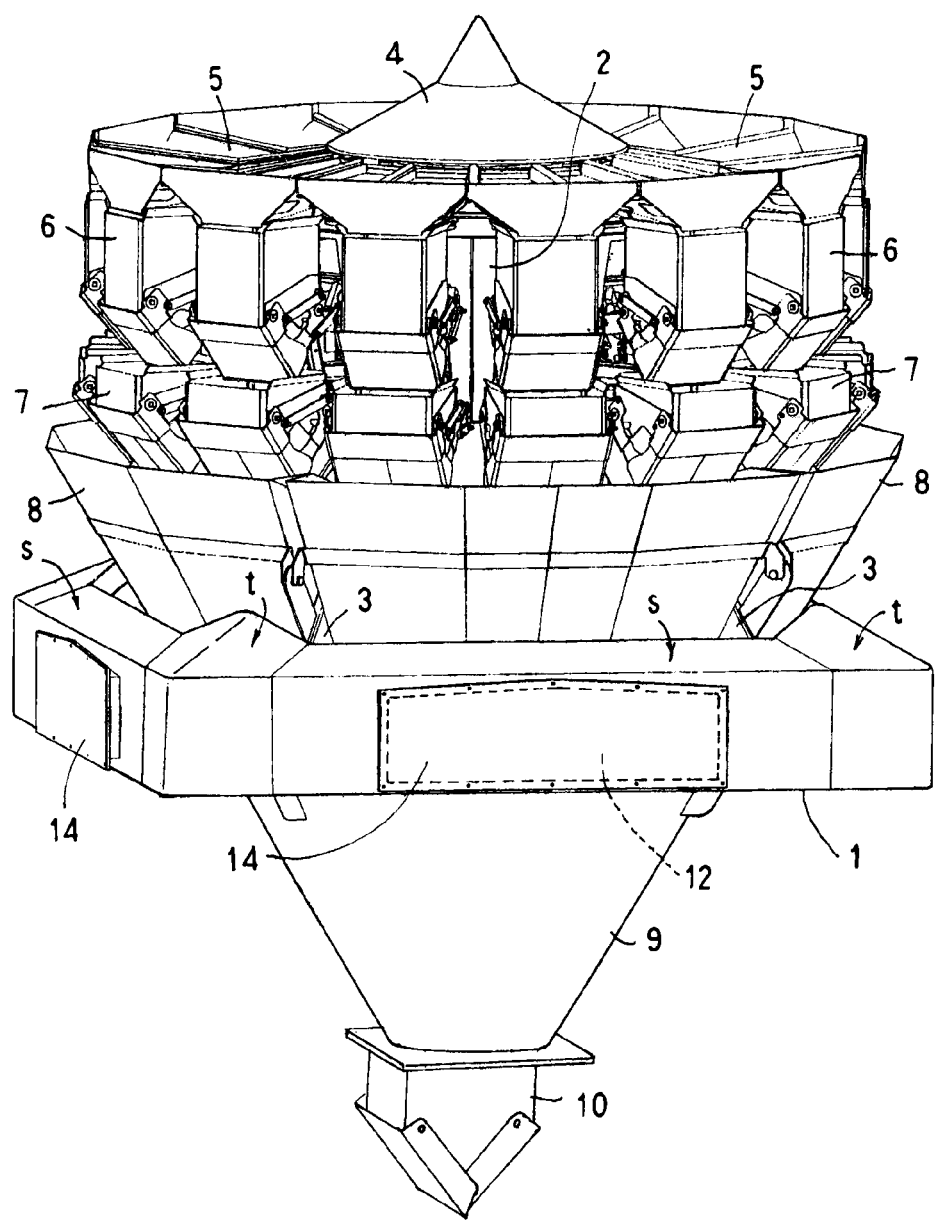
FIG. 1 is a perspective external view of a combination scale according to an embodiment of this invention.

FIG. 1 is a perspective external view of a combination scale according to an embodiment of this invention. The combination scale according to this embodiment may be used in a packaging line in which articles, for example, snacks, sweets or frozen food that have been weighed and having a certain weight that falls within a predetermined range of weights are discharged and thrown into a packaging apparatus below not illustrated in the drawings, so that the weighed articles are packed into bags.

This combination scale is so structured that a substantially columnar center base body 2 is supported on a pedestal 1 at the center of this scale through a plurality of (four in the illustrated example) leg portions 3. The pedestal 1 is located on a floor surface, not illustrated in the drawings, having an opening in which a lower part of the combination scale is insertable.

In the upper direction of the center base body 2, a dispersion feeder 4 is disposed at the center of this scale. The dispersion feeder 4 receives the articles dropping from the edge of a feeding conveyer disposed above, though not illustrated in the drawings. Then, the dispersion feeder 4 transports the received articles by radially dispersing them through vibrations. A large number of linear feeders 5 are disposed around the dispersion feeder 4. These linear feeders 5 transport the supplied articles outward through vibrations.

This combination scale further has, in the outer circumference of the center base body 2, feeding hoppers 6 and weighing hoppers 7. The feeding hoppers 6 temporarily retain and then discharge the articles from the linear feeders 5. The weighing hoppers 7 retain the articles discharged from the feeding hoppers 6 and measures weights of the retained articles.

Inside of the center base body 2 are housed, for example, a vibratory apparatus that drives the dispersion feeder 4 and the linear feeders 5 to vibrate, an apparatus that opens and closes ejection gates of the feeding hoppers 6 and of the weighing hoppers 7, and weight sensors, like load cells, used to measure weights of the articles in the weighing hoppers 7.

Collection chutes 8 are disposed below the weighing hoppers 7. The collection chutes 8 collect, to a position at the center of this scale, the articles ejected from the weighing hoppers 7 selected, through combinatorial computations, as an optimal combination of weighing hoppers containing the articles having a summed weight that falls within a predetermined range of weights. A collection funnel 9 is disposed below the collection chutes 8, and a collection hopper 10 is disposed below the collection funnel 9. The collection funnel 9 receives the articles sliding downward along the collection chutes 8 and collects the received articles further toward the center of this scale. The collection hopper 10 receives and retains the articles collected in the collection funnel 9 and then discharges the articles based on an article supply request received from the packaging apparatus.

Cleaning at regular intervals is indispensably required of the combination scale described herein which is used to weigh foodstuffs like snacks, sweets and frozen food. Cleaning water and/or water generated from frozen food possibly thawed during the weighing operation may often accidentally drop onto the pedestal 1, and such water, if left undried on the pedestal 1, may involve the risk of bacteria and/or mold propagation.

Figure 2:
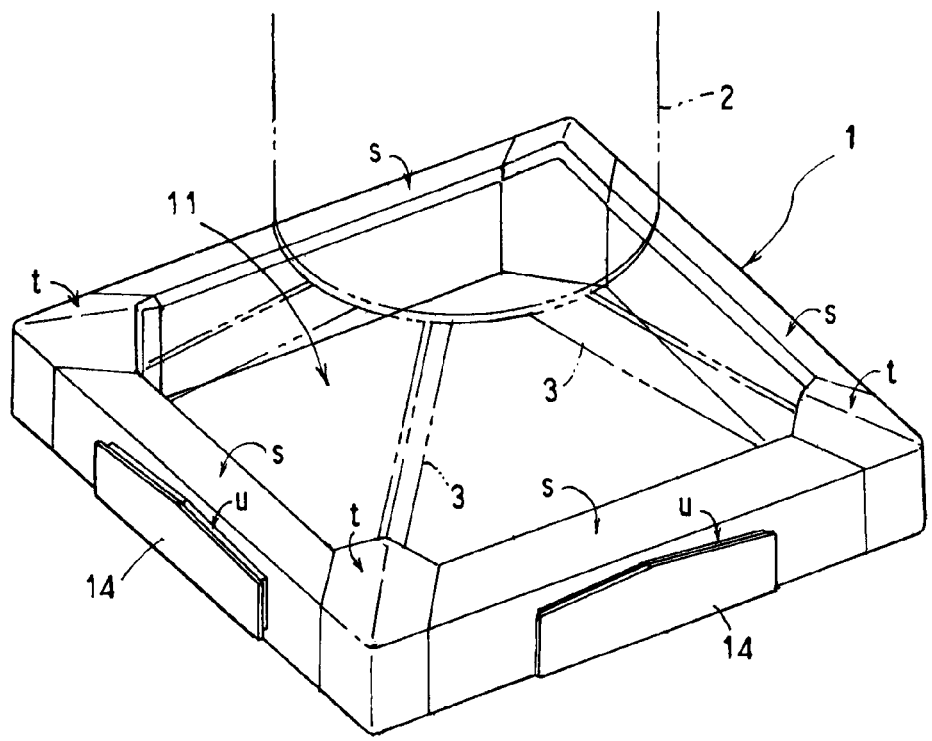
FIG. 2 is a perspective view of a pedestal of the combination scale illustrated in FIG. 1.
Figure 3:
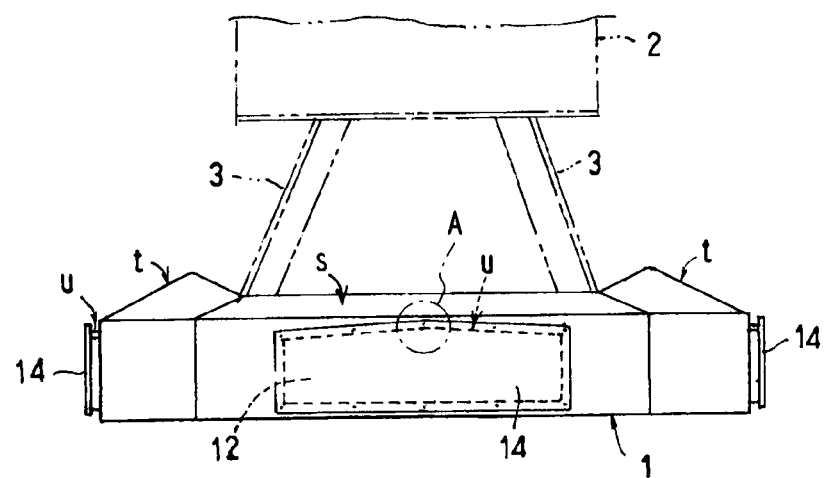
FIG. 3 is a front view of the pedestal illustrated in FIG. 2.
Figure 4:
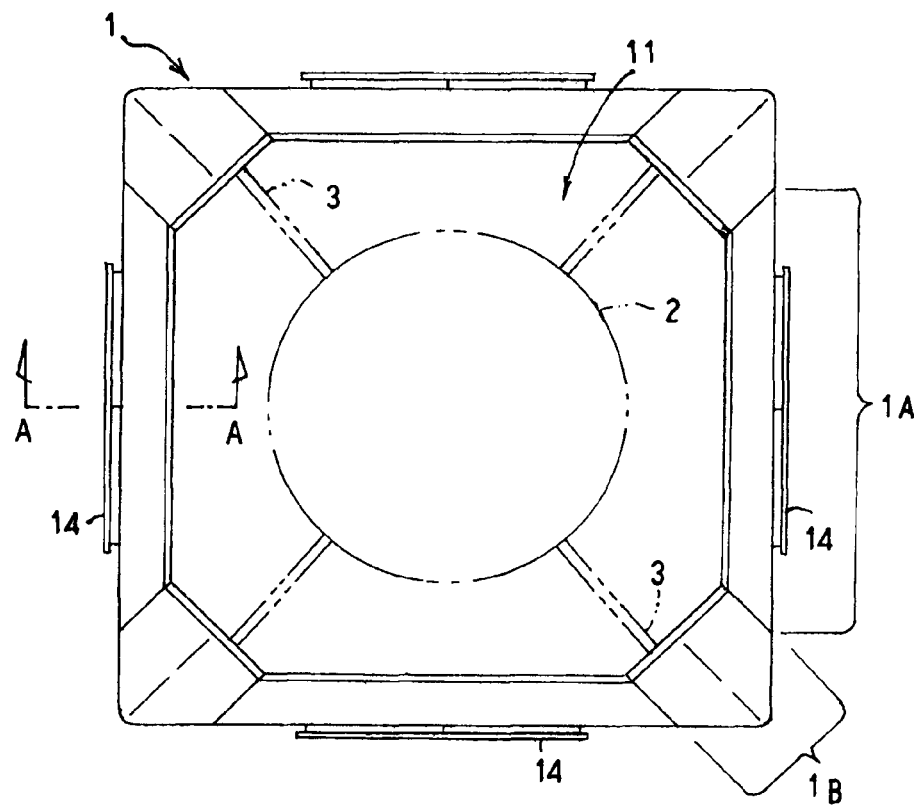
FIG. 4 is a plan view of the pedestal illustrated in FIG. 2.
Figure 5:
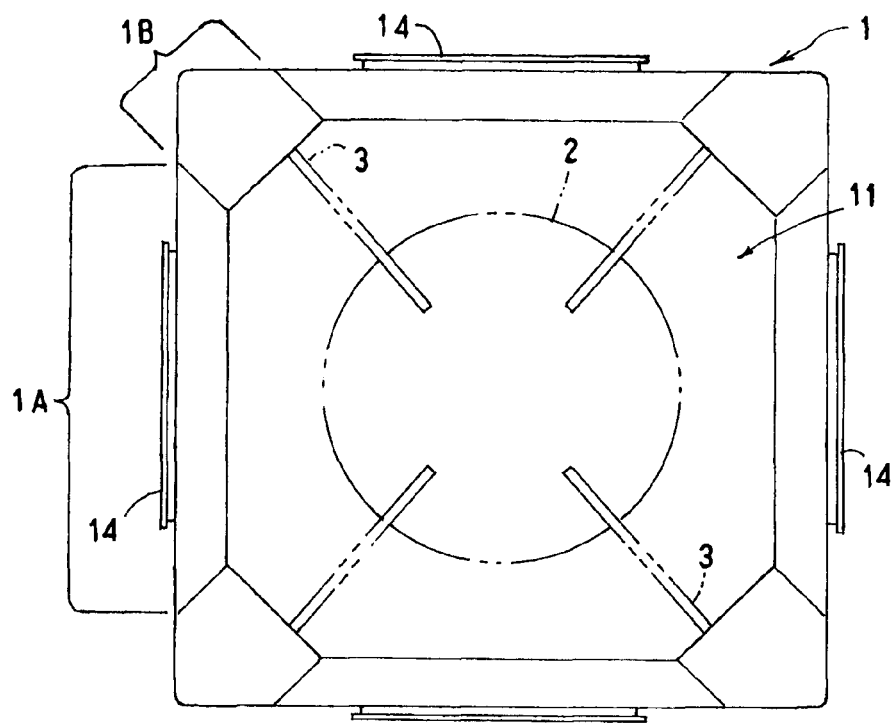
FIG. 5 is a bottom view of the pedestal illustrated in FIG. 2.

In the combination scale according to this embodiment, therefore, the pedestal 1 is structurally characterized as described below. FIG. 2 is a perspective view of the pedestal 1. FIG. 3 is a front view of the pedestal 1. FIG. 4 is a plan view of the pedestal 1. FIG. 5 is a bottom view of the pedestal 1. In these drawings from FIGS. 2 to 5, the center base body 2 supported on the pedestal 1 through the leg portions 3 is illustrated with a virtual line.

The pedestal 1 is a square member in planar view and has, at its center, an octagonal opening 11 that vertically penetrates therethrough. The combination scale is supported on the pedestal 1 with a lower part of this scale being inserted through the opening 11. The pedestal 1 is a hollow plate-like member in which various electrical components are housed.

The pedestal 1 includes linear portions 1A constituting four straight sides of the square shape and also includes corner portions 1B at four corners of the square shape. The linear portions 1A and the corner portions 1B are separately formed as independent members, ends of which are pushed against each other and joined by welding.

Figure 6:
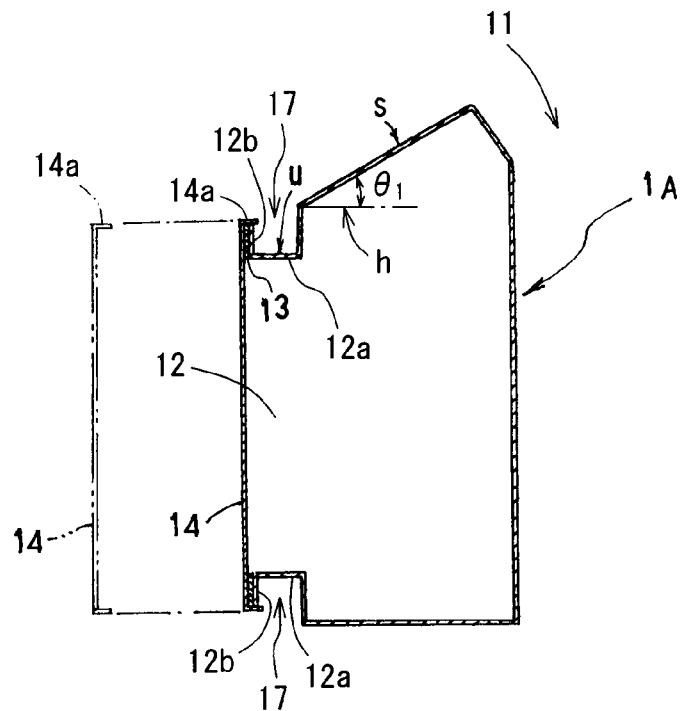
FIG. 6 is an A-A cross-sectional view of FIG. 4 in which no interior component is illustrated.

FIG. 6 is an A-A cross-sectional view of FIG. 4 in which no electrical component housed in the pedestal is illustrated. As illustrated in FIG. 6, an upper surface "s" of each linear portion 1A is inclined downward relative to a horizontal plane "h" through a first angle of inclination θ1 toward an outer end side (toward an end side on left in FIG. 6). The first angle of inclination θ1 may preferably be approximately 5 to 30 degrees. In this embodiment, the first angle of inclination θ1 is 30 degrees.

In this embodiment, however, the upper surface "s" of each linear portion 1A square in planar view is inclined downward toward an outer end side. Thus, cleaning water and/or water generated from thawed frozen food, if it accidentally drops onto the pedestal 1, may be guided to speedily flow downward along the inclined upper surface "s" and then finally discharged.

In this embodiment, an upper part of an inner wall surface facing the opening 11 is steeply inclined inward, so that the upper surface "s" and the inner wall surface do not make an acute angle.

In another embodiment of this invention, the upper surface "s" may be extended as far as an inner end, so that the whole upper surface "s" of the linear portion 1A is equally inclined through the first angle of inclination θ1, i.e., the upper surface "s" may be inclined downward toward an outer end side along the whole width of the pedestal 1 in a direction from its inner to outer side (lateral direction in FIG. 6).

Figure 7:
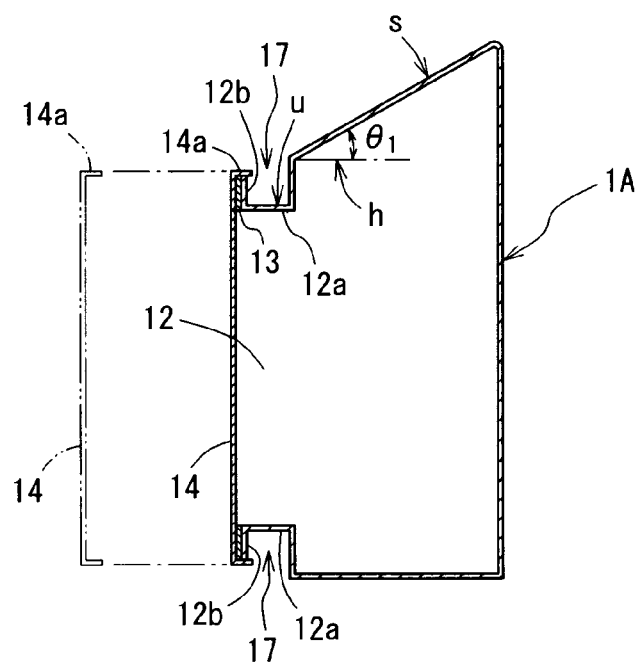
FIG. 7 is a cross-sectional view according to another embodiment of this invention illustrated correspondingly to FIG. 6.

According to the embodiment illustrated in FIG. 7, cleaning water or any other fluid may be guided to flow downward and discharged along the upper surface "s" of the pedestal 1. This may prevent such water from dropping into the packaging apparatus disposed below the opening 11 formed on the inner side of the pedestal 1.

The inclined surface inclining downward toward an outer end may preferably have a width that accounts for at least 50% or more, preferably 70% or more, or more preferably 80% or more of the width of the pedestal 1 in the direction from its inner to outer side.

As illustrated in FIGS. 1 to 3, the corner portions 1B each have an upper surface "t" formed in a chevron-like shape that protrudes more upward than the upper surface "s" of the linear portion 1A. The corner portions 1B are thus improved in rigidity.

Figure 8:
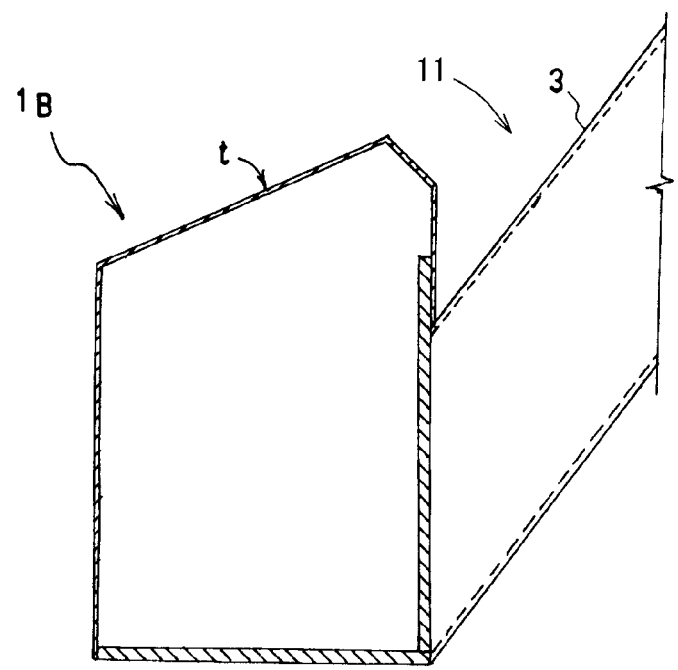
FIG. 8 is a longitudinal cross-sectional view of a corner portion of the pedestal in which no interior component is illustrated.

FIG. 8 is a longitudinal cross-sectional view of the corner portion 1B in which no electrical component housed in the pedestal is illustrated. As illustrated in FIG. 8, the upper surface "t" of the corner portion 1B is an inclined surface inclining downward toward an outer end (toward an end on left in FIG. 8). Like the linear portion 1A, cleaning water or any other fluid on the inclined upper surface "t" of the corner portion 1B may be guided to speedily flow downward along this surface and then finally discharged.

In yet another embodiment of this invention, the upper surface "t" of the corner portion 1B may be extended as far as an inner end similarly to the upper surface "s" of the linear portion 1A illustrated in FIG. 7 in order to prevent cleaning water or any other fluid from dropping into the packaging apparatus disposed below the opening 11 formed on the inner side of the pedestal 1.

The bottom surface and the inner wall surface facing the opening 11 of the corner portion 1B are made from a thick plate material and are thereby improved in rigidity. The leg portions 3 serving to support the center base body are coupled to the inner wall surface.

By thus having the leg portions 3 supporting the center base body 2 coupled to the corner portions 1B improved in rigidity, the weight of the center base body 2 may be reliably and precisely supported.

Figure 9:
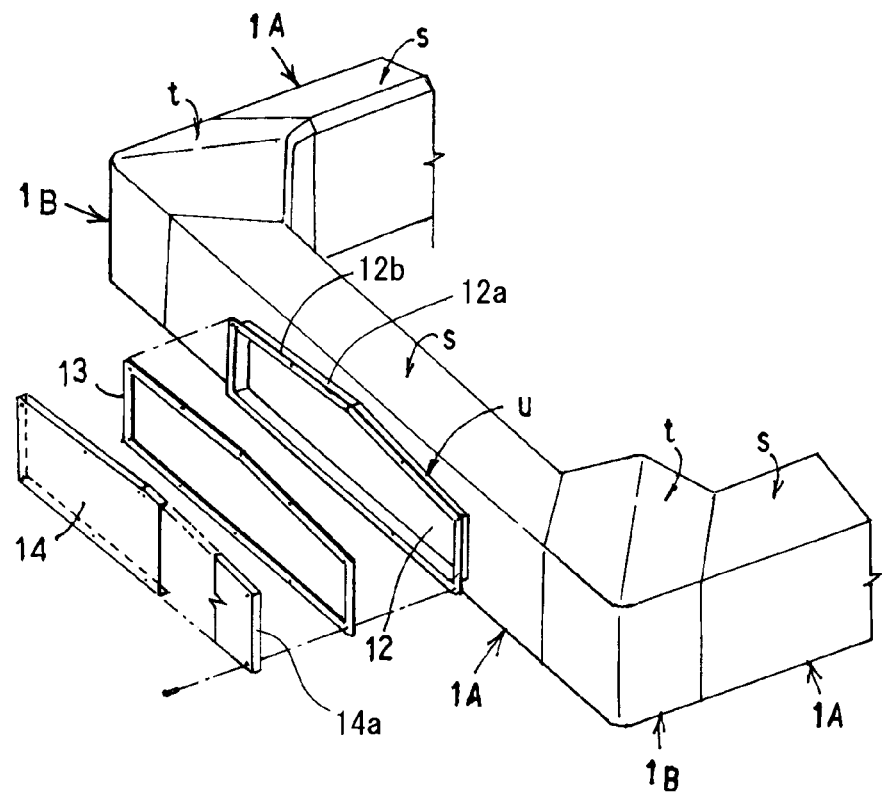
FIG. 9 is an exploded perspective view illustrating the pedestal in part.

As illustrated in the exploded perspective view of FIG. 9, the outer wall surfaces of the linear portions 1A constituting four sides of the square shape in planar view, i.e., lateral surfaces of the pedestal 1, each have an opening 12 at substantially the center in its longitudinal direction (lateral direction in FIG. 3). The openings 12 are used for inspection and maintenance of the electrical components housed inside of the linear portions 1A.

In this embodiment, the opening 12, when viewed from the front side, has a horizontally long pentagonal shape, with its upper side gently curving like a chevron, whose apex is located at the center of the upper side, as illustrated in FIG. 3. Thus, the upper side of the opening 12 forms a chevron-like shape with a gentle curve, the apex of which is located at the center.

As illustrated in FIG. 6, the peripheral edge of the opening 12 constitutes a protruding portion 12a that protrudes outward (leftward in FIG. 6). The protruding portion 12a, when viewed from the front side, has a horizontally long pentagonal shape like the opening 12. An upper surface "u" of the protruding portion 12a on the upper side, which constitutes the upper side of the opening 12, has a chevron-like shape with a gentle curve extending along the upper side.

An end of protrusion of the protruding portion 12a at the peripheral edge of the opening 12 is folded outward, i.e., toward the outer side of the opening. This end of protrusion thus folded forms a flange portion 12b. The outer shape of the flange portion 12b, when viewed from the front side, is a horizontally long pentagonal shape like the opening 12.

A cover plate 14 is detachably coupled with screws to the outer surface of the flange portion 12a through a packing member 13 for sealing. Thus, the opening 12 for inspection and maintenance may be water-tightly sealed with both of the cover plate 14 and the packing member 13.

The cover plate 14 has an outer shape slightly larger than that of the flange portion 12b of the opening 12 and thus has a horizontally long pentagonal shape likewise when viewed from the front side. As illustrated in FIGS. 6 and 9, the cover plate 14 has an outer peripheral edge 14a folded inward. This outer peripheral edge 14a is fitted onto the flange portion 12b so as to cover a packing-used sealed portion of the opening.

The protruding portion 12a protrudes outward from the peripheral edge of the opening 12, and the flange portion 12b is formed by folding outward an end of protrusion of the protruding portion 12a. As a result, annular grooves 17 are each formed along the outer periphery of the opening 12 by the protruding portion 12a, flange portion 12b and the outer wall surface at the peripheral edge of the opening 12.

Cleaning water or any other fluid may be guided to flow downward down along the upper surface "s" inclining downward toward the outer side of the linear portion 1A of the pedestal 1, and this flow of water may be partly guided into the long groove 17 on the upper side extending along the longitudinal direction of the opening 12 for inspection and maintenance.

In this embodiment, the opening 12, when viewed from the front side, has a horizontally long pentagonal shape, with its upper side gently curving like a chevron, whose apex is located at the center of the upper side. In the protruding portion 12a that protrudes outward from the peripheral edge of the opening 12 and constitutes the upper groove 17, its upper surface "u" has a horizontally long pentagonal shape, with its upper side gently curving like a chevron, whose apex is located at the center of the upper side, similarly to the upper side of the opening 12.

Figure 10:
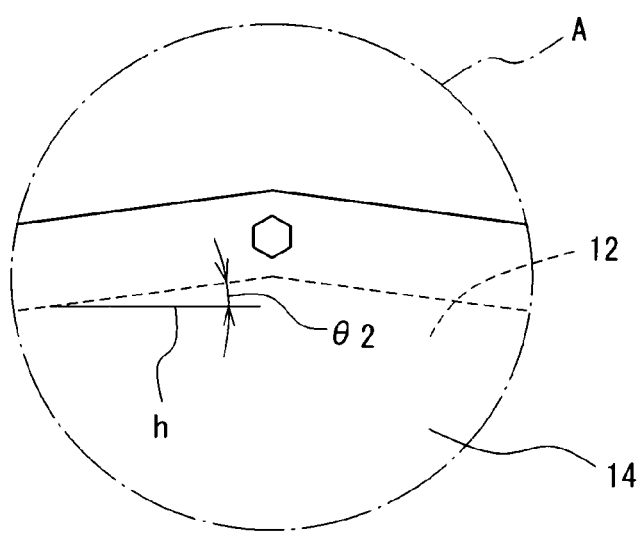
FIG. 10 is an enlarged view of part A illustrated in FIG. 3.

The chevron-like gentle slope of the upper surface "u" of the protruding portion 12a is the same angle of inclination as the upper side of the opening 12, as illustrated in FIG. 10; an enlarged view of a part A illustrated in FIG. 3 with a dashed-dotted line. This angle of inclination; a second angle of inclination θ2 relative to the horizontal plane "h", may preferably be approximately three to five degrees. In this embodiment, the second angle of inclination θ2 is five degrees.

Cleaning water or any other fluid may flow downward along the upper surface "s" inclining toward the outer side of the linear portion 1A into the upper groove 17 of the opening 12 for inspection and maintenance. Then, the water is guided in the groove 17 to flow downward along the upper surface "u" inclining through the second angle of inclination θ2 of the protruding portion 12a constituting the groove 17. The water thus guided may be then finally discharged.

According to this embodiment, the upper surfaces "s" and "t" of the pedestal 1 are both inclined surfaces directed downward toward the outer end side. Thus, cleaning water and/or water generated from unthawed frozen food, if it drops on the pedestal 1, may be speedily guided downward and then discharged along the inclined upper surfaces "s" and "t".

Cleaning water or any other fluid thus guided downward to be discharged may partly flow into the protruding portion 12a that protrudes outward from the peripheral edge of the opening 12. The upper surface "u" of the protruding portion 12a has a chevron-like shape with a gently curve whose apex is located at its center. The groove 17 is formed by this upper surface "u", the outer peripheral surface and the flange portion 12b. Cleaning water or any other fluid running into the protruding portion 12a constituting the groove 17 may diverge and flow downward along the slopes on two sides of the chevron apex toward both ends of the pedestal and then discharged from these ends.

Cleaning water or any other fluid may be thus unlikely to stay on the upper surface "s" or "t" of the pedestal 1 or on the upper surface "u" of the protruding portion 12a. Thus, the upper surfaces "s" and "t" of the pedestal 1 and the upper surface "u" of the protruding portion 12a may become naturally dry soon without any wiping-off work, successfully preventing the risk of bacteria and/or mold propagation.

Other Embodiments

The scope of this invention may include the following modes.

1] The planar shape of the pedestal 1 is not necessarily limited to the square or rectangular and may be selected from polygonal shapes with more than four angled corners 2] The chevron-like shape having its apex at the center, which was described thus far, is just an exemplified shape of the upper surface "u" of the protruding portion 12a along the upper side of the opening 12 for inspection and maintenance. Instead, the upper surface "u" may be inclined from one end to the other end of the upper side like a shed roof.

3] The lower side of the opening 12 for inspection and maintenance, when viewed from the front side, may have a reversed chevron-like shape, i.e., a gently curved V-like shape symmetric to the shape of the upper side "u" in which the lower side protrudes downward.

REFERENCE SIGNS LIST 1 pedestal
1A linear portion
1B corner portion
2 center base body
3 leg portion
4 dispersion feeder
5 linear feeder
6 feeding hopper
7 weighing hopper
8 collection chute
9 collection funnel
10 collection hopper
11 opening
12 opening for inspection and maintenance
12a protruding portion
12b flange portion
13 packing member
14 cover plate
17 groove

The invention claimed is:

1. A combination scale, comprising:
a pedestal having, in a central part thereof, an opening that vertically penetrates therethrough;
a center base body supported on the pedestal through a leg portion;
a dispersion feeder disposed in an upper part of the center base body, the dispersion feeder being driven to receive and radially transport an article;
a plurality of linear feeders disposed around the dispersion feeder, the linear feeders being driven to transport the article received from the dispersion feeder; and
a plurality of hoppers disposed in an outer circumference of the center base body, the hoppers being driven to retain and discharge the article,
the pedestal having an upper surface inclined downward toward an outer end thereof,
wherein
the pedestal is structurally hollow and has an opening on a lateral surface thereof, and the pedestal further has a protruding portion formed by protruding a peripheral edge of the opening outward, the protruding portion constituting an upper side of the opening and having an upper surface inclined downward toward an end of the upper side.

2. The combination scale according to claim 1, wherein the upper side of the opening forms a chevron-like shape with an apex thereof being located at a central position, and the upper surface of the protruding portion has a chevron-like shape along the upper side of the opening.

3. The combination scale according to claim 1 or 2, wherein the pedestal has a flange portion formed by folding outward an end of protrusion of the protruding portion at the peripheral edge of the opening, and a cover plate is attached to an outer surface of the flange portion with a sealing member being interposed therebetween to water-tightly close the opening.

4. The combination scale according to claim 3, wherein the pedestal has an angular outer shape in planar view, a corner portion of the angular shape includes a material that differs from a material used to form a linear portion other than the corner portion, and the corner portion and the linear portion are pushed against and joined to each other.

5. The combination scale according to claim 4, wherein the corner portions protrudes more upward than the upper surface of the linear portion.

6. The combination scale according to to claim 1 or 2, wherein the pedestal has an angular outer shape in planar view, a corner portion of the angular shape includes a material that differs from a material used to form a linear portion other than the corner portion, and the corner portion and the linear portion are pushed against and joined to each other.

7. The combination scale according to claim 6, wherein the corner portion protrudes more upward than the upper surface of the linear portion.

* * * * *